March 17, 1942. J. W. PETERSON 2,276,697
PLANTER ATTACHMENT FOR TRACTORS
Filed Sept. 18, 1939 4 Sheets-Sheet 1

J. W. Peterson
INVENTOR.
BY CA Knowles.
ATTORNEYS.

March 17, 1942. J. W. PETERSON 2,276,697
PLANTER ATTACHMENT FOR TRACTORS
Filed Sept. 18, 1939 4 Sheets-Sheet 2

J.W. Peterson
INVENTOR.
BY C.A.Snow&Co.
ATTORNEYS.

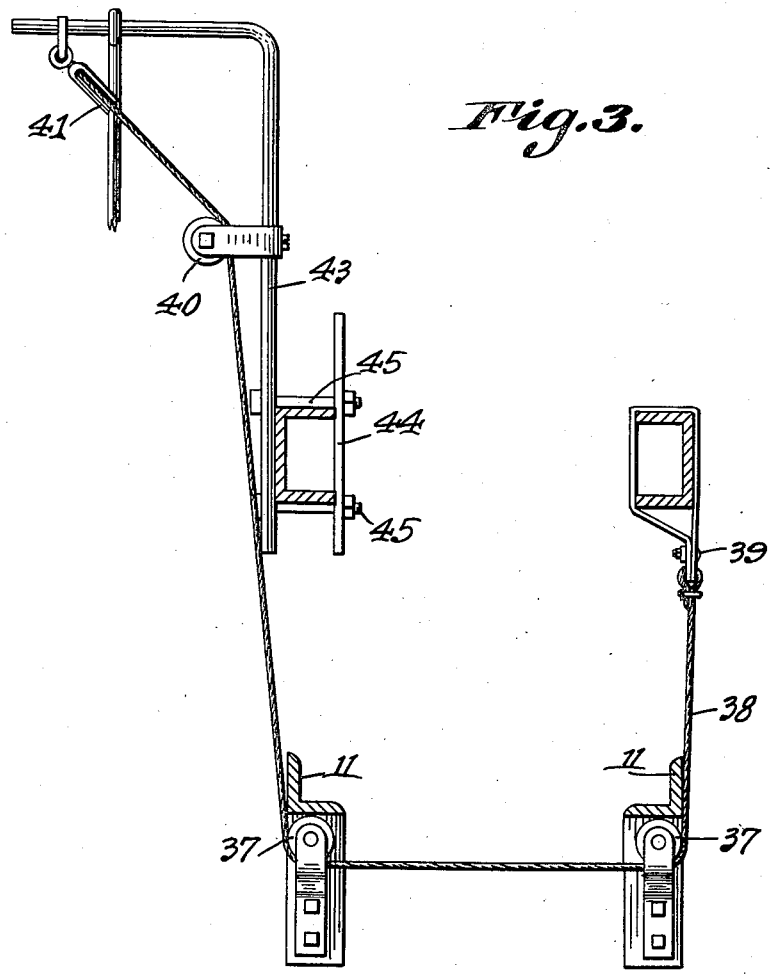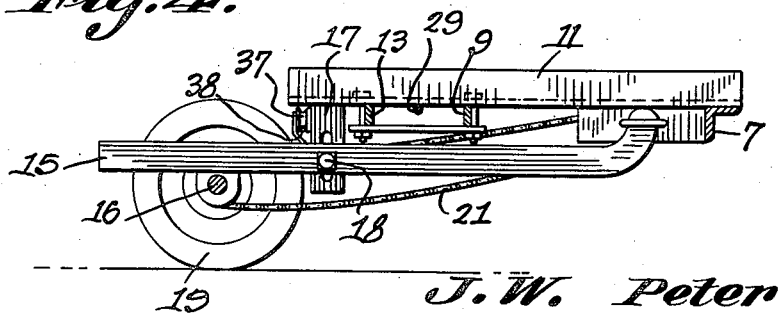

March 17, 1942.  J. W. PETERSON  2,276,697

PLANTER ATTACHMENT FOR TRACTORS

Filed Sept. 18, 1939  4 Sheets-Sheet 4

J. W. Peterson
INVENTOR.

BY *[signature]*

ATTORNEYS.

Patented Mar. 17, 1942

2,276,697

UNITED STATES PATENT OFFICE 2,276,697

PLANTER ATTACHMENT FOR TRACTORS

John Walfred Peterson, Canton, S. Dak.

Application September 18, 1939, Serial No. 295,541

3 Claims. (Cl. 111—59)

This invention relates to farm implements, and more particularly to means for attaching farm implements to tractors, whereby the usual horse-drawn double row planter may be converted into a motor-propelled planter.

An important object of the invention is to provide a device of this character wherein the implement may be supported under the tractor in such a way that the check wires of the planter implement will be guided laterally and held away from the wheels of the tractor, when the tractor is turning as at the end of a field, during the planting operation.

Another object of the invention is the provision of means to readily and securely attach an implement under the frame of the usual tractor, to the end that other implements such as a drag, may be hitched to the draw bar of the tractor to operate simultaneously with the planting operation.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 3 is a diagram illustrating the planter elevating and lowering mechanism.

Figure 4 is a fragmental elevational view illustrating the means for regulating the steps of operation of the planter shoes.

Figure 1:
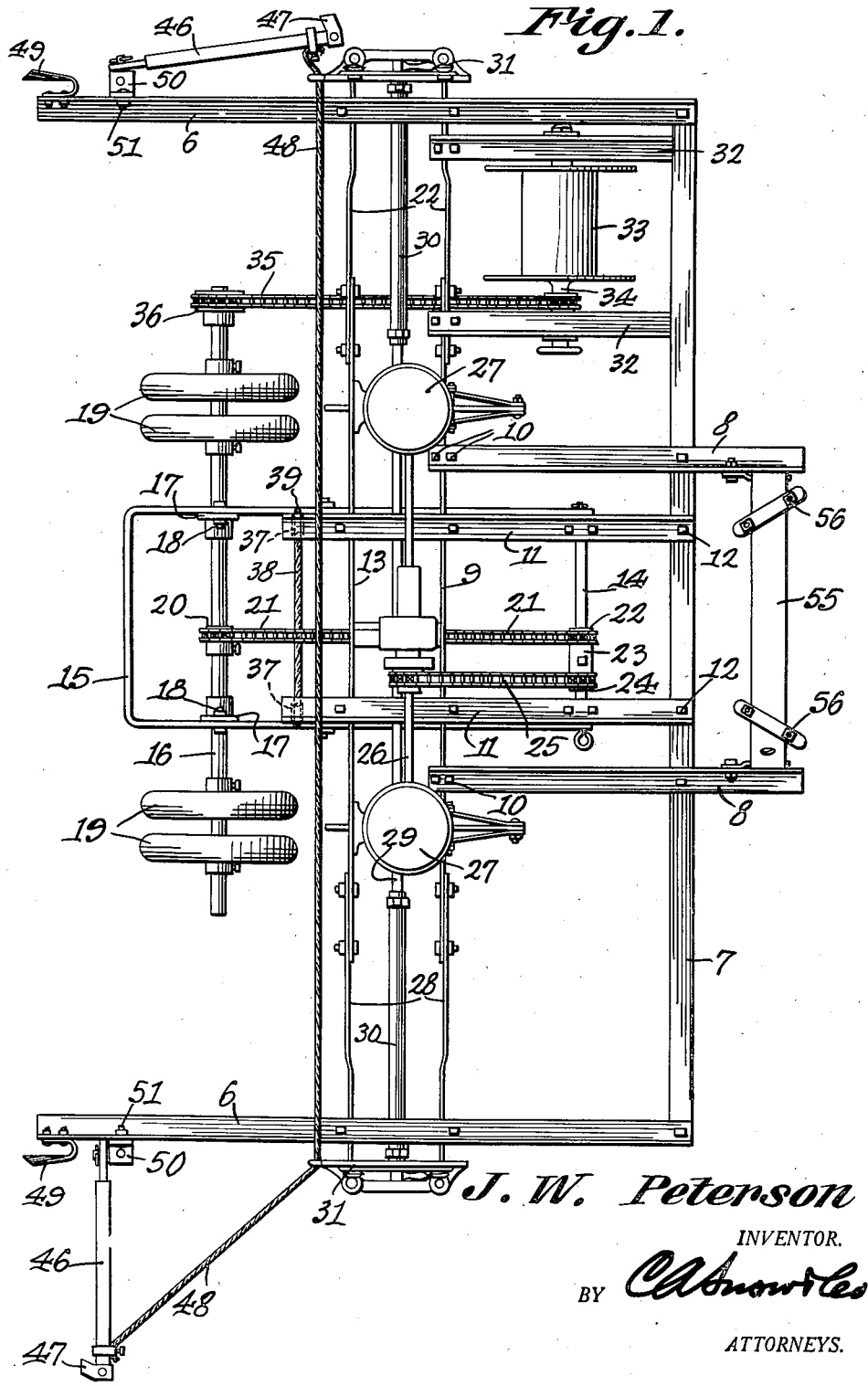
Figure 1 is a plan view of a planter implement, constructed in accordance with the invention.

Referring to the drawings in detail, the reference character 5 designates the usual farm tractor, to which the farm implement, which in the present showing constitutes a planter, is attached.

The planter comprises side bars 6 that have their forward ends connected by means of the bar 7. Spaced bars 8 are bolted to the bar 7, at points adjacent to the forward ends thereof, the rear ends of the bars 8 being secured to the bar 9, by means of U-shaped bolts 10. The frame of the planter is further braced by means of the parallel bars 11 that have their forward ends bolted to the bar 7, at 12, the bars 11 being also connected with the bar 13, that extends in parallel spaced relation with the bar 9.

Connecting the bars 11, is a shaft 14 to which the forward end of the frame 15 is pivotally connected, to the end that the initial position of the frame 11 may be adjusted with respect to the planter frame. This frame 15 provides a support for the shaft 16, the frame being adjustably connected to the planter frame, by means of the vertical bars 17 that are formed with elongated openings for the reception of the bolts 18, so that the shaft 16 may be adjusted vertically with respect to the frame 15. Secured to the shaft 16 are wheels 19 that contact the ground surface rotating the shaft 16. Mounted on the shaft 16 at a point within the frame 15, is a sprocket 20 over which the chain 21 operates, the chain 21 also operating over the sprocket 22 formed at one end of the sleeve 23 that is secured to the shaft 14. A sprocket 24 is formed at the opposite end of the sleeve 23. The chain 25 operates over sprocket 24 and transmits movement to the shaft 26 that extends transversely of the frame of the implement, and operates the valves of the planting units 27.

The planting units are mounted on the bars 9 and 13, which have their ends adjustably connected with the bars 28 that extend inwardly from the side bars 6 of the frame.

The support for the planting units 27 also includes a central shaft 29 that has its ends extending into the tubular members 30 where they are adjustably secured thereto. These tubular members 30 have their outer ends extended through the side bars 6, where they provide support for the trip mechanism 31.

Thus it will be seen that due to the adjustable connection between the bars 9, 13 and 28, the width of the frame may be appreciably increased, permitting a drag or harrow to be connected with the device without interference with the check wire of the planter.

Secured to the front bar 7, are spaced bars 32 between which the reel 33 is mounted, and on which the usual check row wire is wound. The reel 33 operates on the shaft 34 that in turn is provided with a sprocket over which the chain 35 operates, the chain 35 also operating over the sprocket 36 carried at one end of the shaft 16, so that the reel 33 may be rotated to wind the check row wire thereon. Mounted on the bars 17 that depend from the bars 11 are pulleys 37 which provide guides for the cable 38 which has one of its ends secured to one of the bars 11 as at 39, the opposite end of the cable passing upwardly over the pulley 40, from where it passes over the pulley 41, to the lever 42 which is disposed adjacent to the operator's seat, to the end that the operator may, by operating the lever 42, raise and lower the planter frame and frame 15, to throw the mechanism into and out of operation.

The pulleys 40 and 41 are supported by the rod 43 that is secured to one of the bars 11, by means of the plate 44 and bolts 45.

Pivotally mounted on each of the side bars 6, is a marker arm 46 that carries a marker 47 at its outer end. These marker arms at opposite sides of the frame, are connected by means of the cable 48 in such a way that when one of the marker arms 46 is extended to its operative or marking position, the marker arm at the opposite side of the frame is moved inwardly to its inactive position.

At the free end of each of the side bars 6, is a stationary guide member 49 which guide members are formed with inturned ends between which the check wire not shown engages, to hold the check wire out of contact with the wheels of the tractor, when the tractor is being turned as at one end of the field being planted.

The marker arms 46 are pivotally mounted on the brackets 50 that extend downwardly from the side bars 6, the bracket being provided with a plurality of openings spaced apart and of diameters to receive the bolts 51, by means of which the brackets may be adjusted vertically regulating the depth of operation of the markers.

Figure 10:
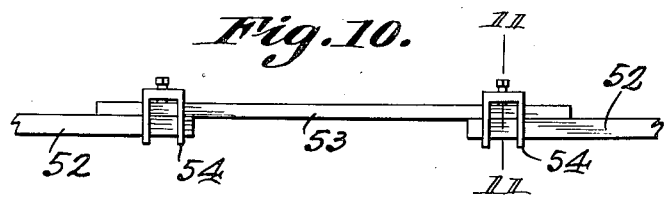
Figure 10 is a plan view of a modified form of adjustable planter unit support.
Figure 11:
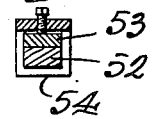
Figure 11 is a sectional view taken on line 11—11 of Figure 10.
Figure 9:
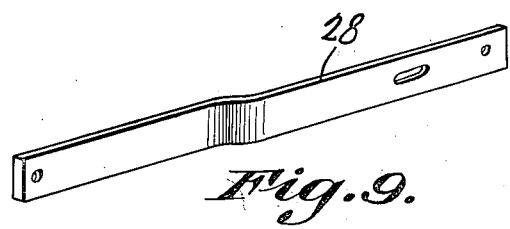
Figure 9 is a perspective view of one of the planter unit supporting bars.

In Figure 10 of the drawings, I have illustrated a modified form of adjustable planter unit supporting bars. In this form of the invention the outer ends of the bars are indicated by the reference character 52, the bars 52 being connected by the bar 53 which is adjustable with respect to the bars 52, as by means of the U-shaped clamps 54.

Figure 2:
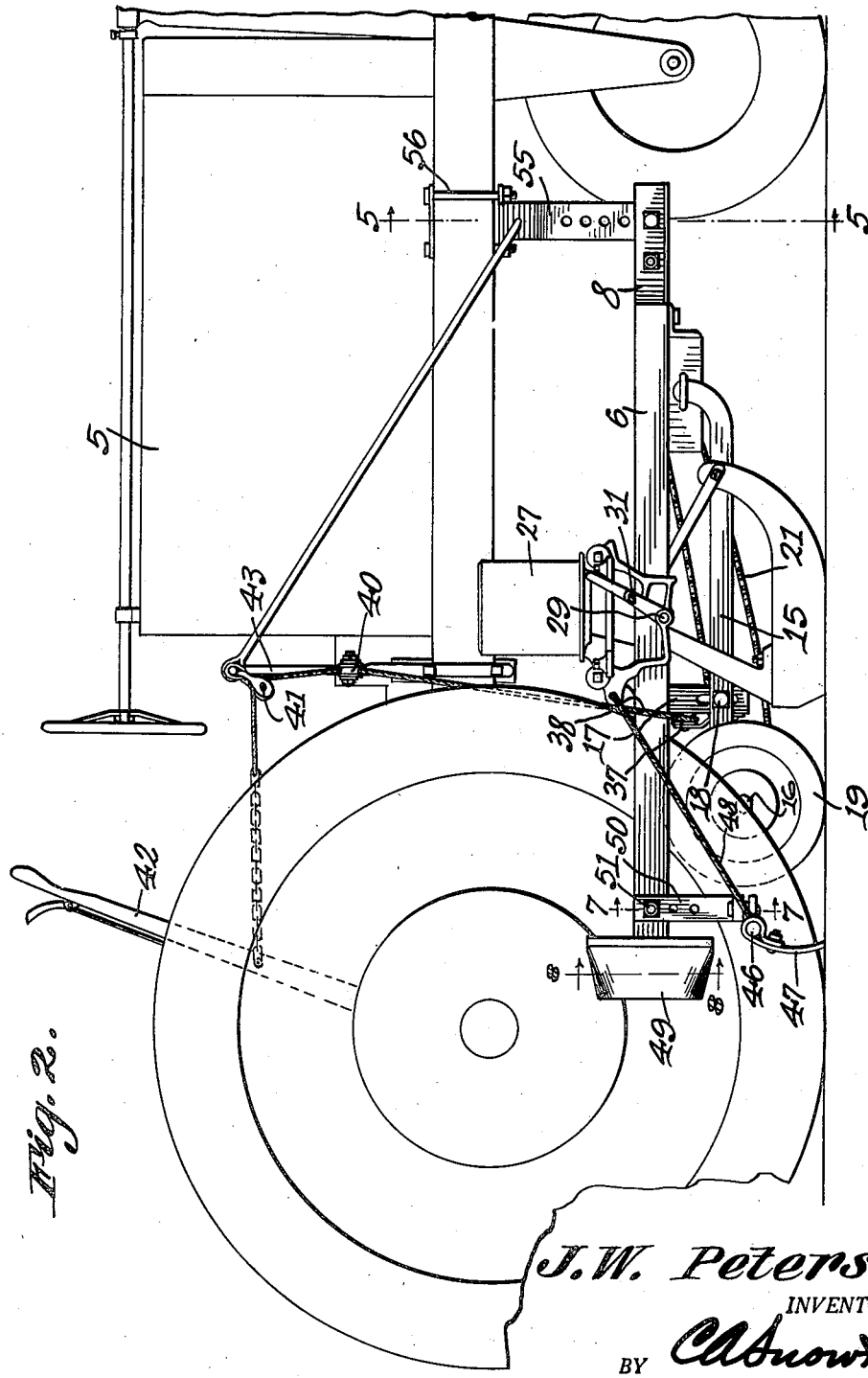
Figure 2 is a side elevational view thereof illustrating the planter implement as secured to a tractor frame.
Figure 5:
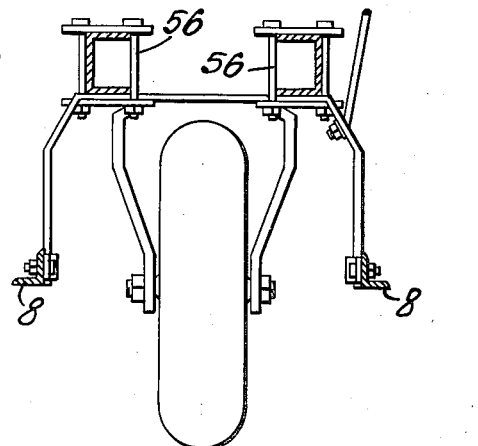
Figure 5 is a sectional view taken on line 5—5 of Figure 2.
Figure 6:
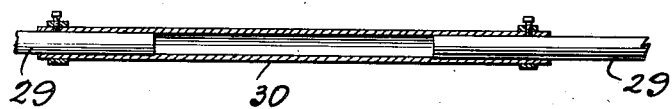
Figure 6 is a fragmental sectional view through the adjustable planter unit supporting members.
Figure 7:
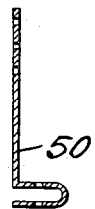
Figure 7 is a sectional view taken on line 7—7 of Figure 2 with parts omitted.
Figure 8:
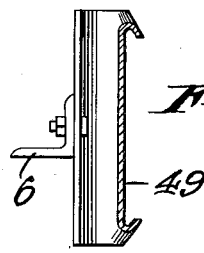
Figure 8 is a sectional view taken on line 8—8 of Figure 2.

It might be further stated that the forward ends of the spaced bars 8 are connected by means of the bar 55, to which the U-shaped connecting bolts 56 are secured, the connecting bolts 56 being designed to also clamp the side rails of the tractor with which the implement is used, as clearly shown in Figure 2 of the drawings.

From the foregoing it will be seen that due to this construction, I have provided means whereby a farm implement such as a planter, may be readily and easily mounted on the frame of the usual farm tractor, directly under the frame and between the front and rear wheels thereof, the frame being adjustable laterally, so that a drag or harrow may be hitched to the planter and pulled to cover the seeds dropped by the planter, without interference with the usual check wire of the planter.

What is claimed is:

1. A planter adapted to be connected with a tractor under the tractor frame, comprising a substantially wide main frame embodying a forward bar, substantially long end bars connected with the forward bar, spaced short bars connected with the forward bar at a point adjacent to the center of the forward bar, the forward ends of said spaced short bars extending beyond the forward bar, a connecting bar having downwardly extended ends, adapted to be connected to a tractor frame, said downwardly extended ends having a plurality of vertically spaced openings, bolts extending through the forward ends of the short bars and said openings, adjustably connecting the main frame with a tractor frame, planting units mounted on the main frame, and means including a wheel-supported frame, connected with the main frame and adapted to operate said planting units.

2. A planter adapted to be connected under a tractor frame, comprising a main frame, a pair of spaced rearwardly extended short bars mounted adjacent to the center of the frame, the forward ends of said bars extending beyond the front ends of the frame, an inverted U-shaped coupling bar connected with the forward ends of the short bars and rising above the frame, means for connecting the coupling bar to a tractor, a pair of spaced parallel bars between said short bars, a substantially narrow wheel-supported frame pivotally connected with the last mentioned bars, planting units on the main frame, and means for transmitting movement of the wheels of the wheel-supported frame to the planting units, operating the planting units.

3. A planter adapted to be connected under a tractor frame, comprising a laterally adjustable main frame, means for adjustably connecting the forward end of the main frame to a tractor frame, a substantially narrow wheel-supported frame connected with the main frame, at a point intermediate the ends thereof, planting units mounted on the main frame, and means for transmitting movement of the wheel-supported frame to the planting units.

JOHN WALFRED PETERSON.